INVENTOR.
Robert M. Reams

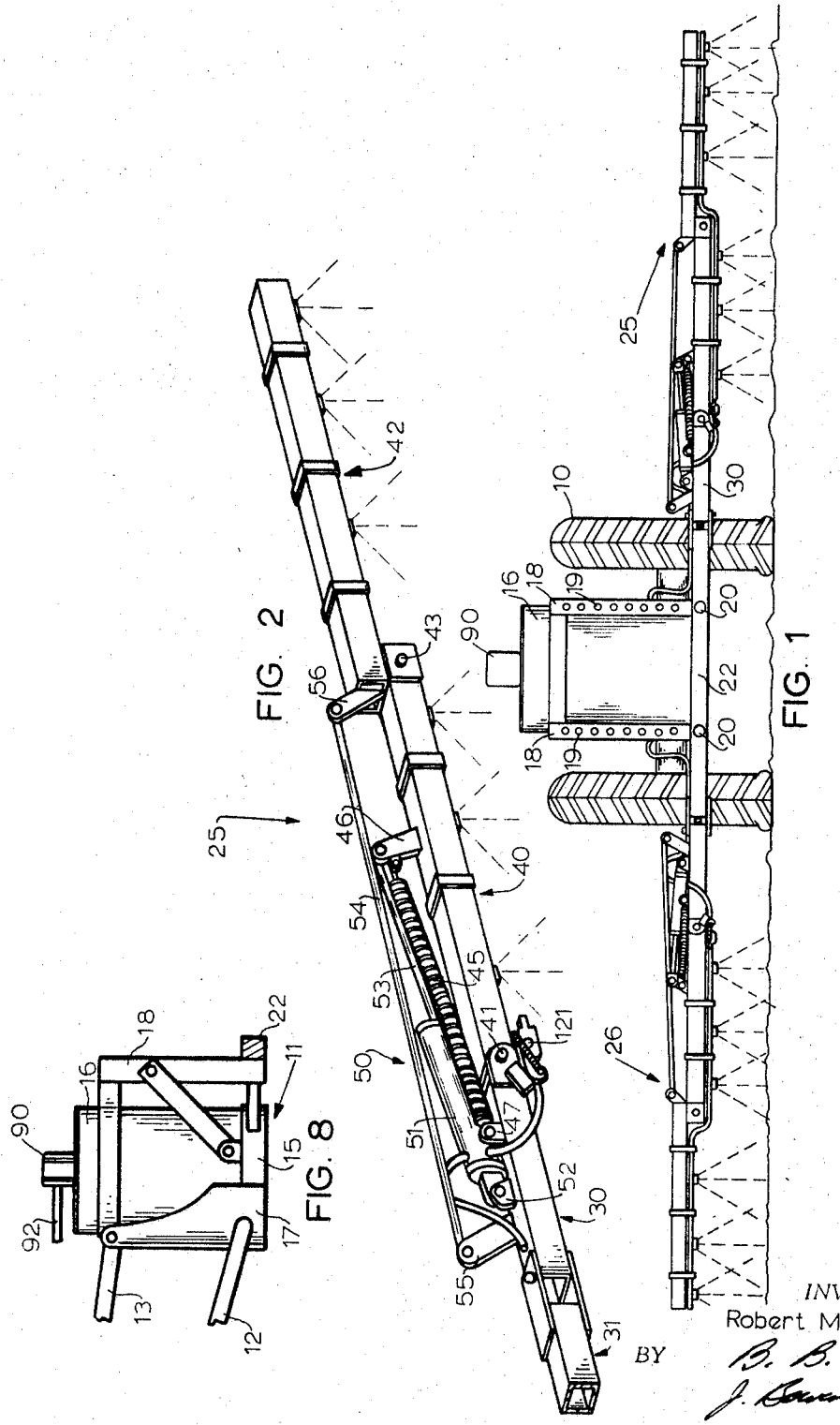

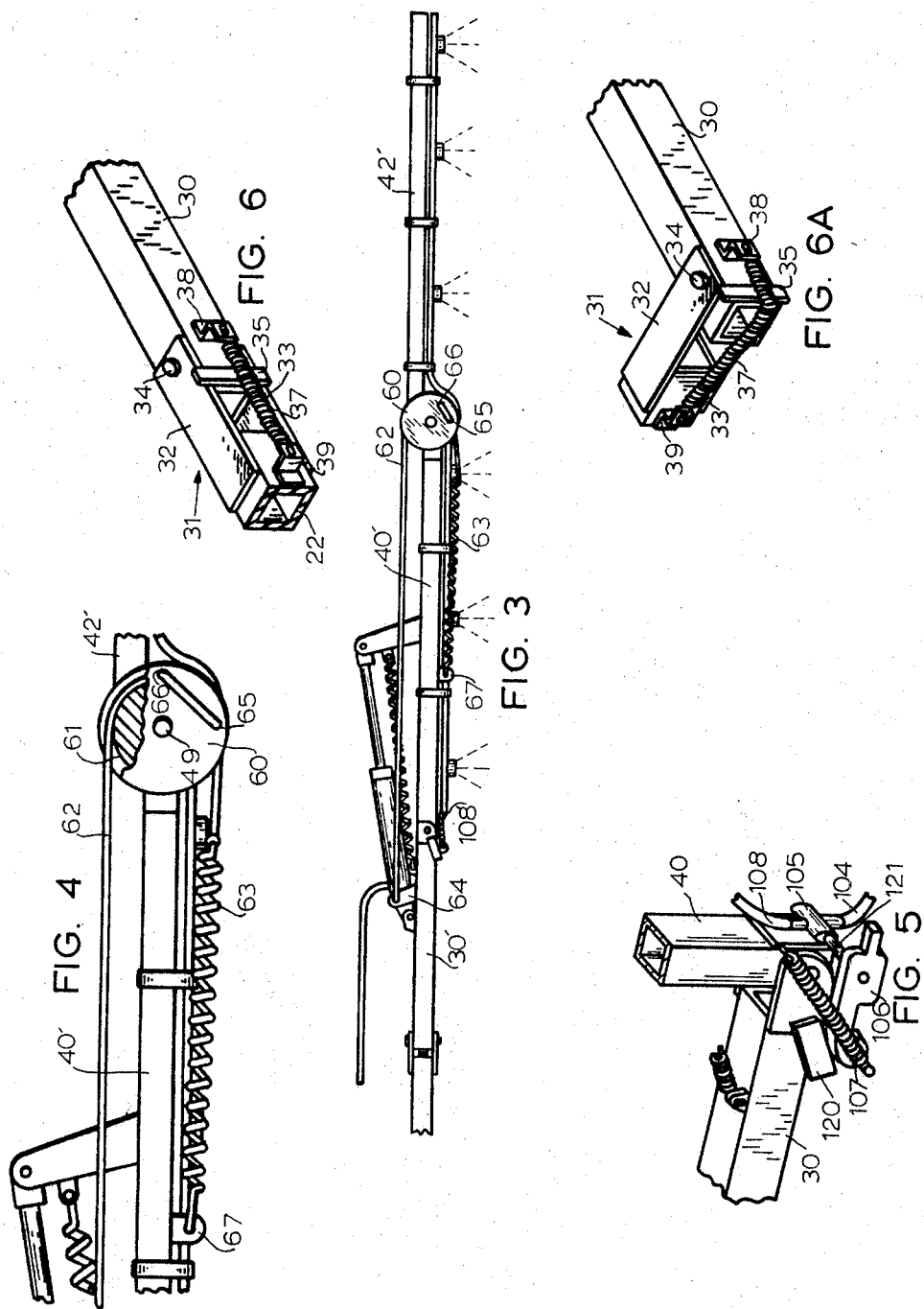

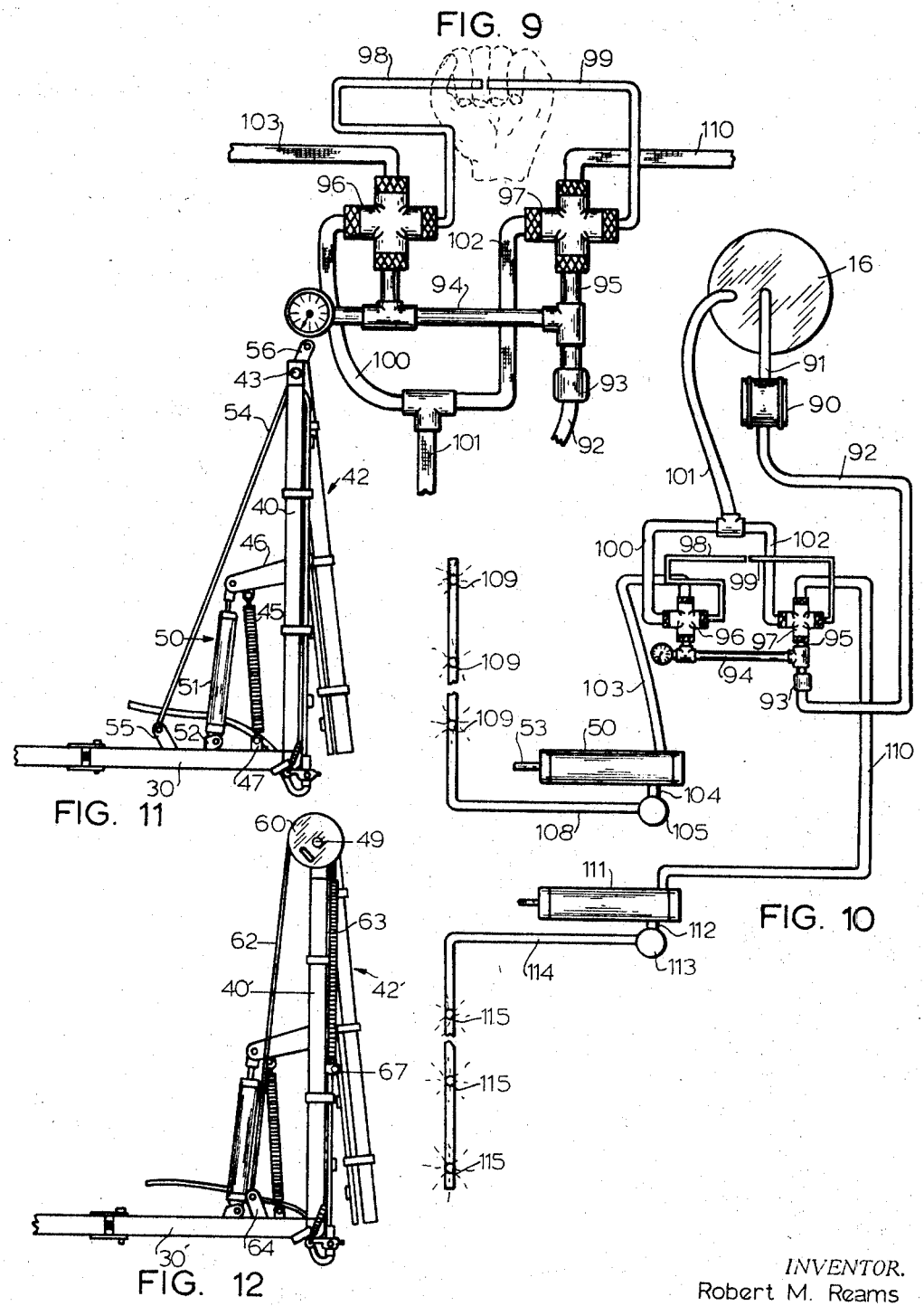

BY

ATTORNEYS

3,425,628
FOLDING BOOM AGRICULTURAL SPRAYER
Robert M. Reams, Rte. 2, Apex, N.C. 27502
Filed Mar. 17, 1967, Ser. No. 624,047
U.S. Cl. 239—168          7 Claims
Int. Cl. B05b *1/20, 9/06;* B67d *5/08*

ABSTRACT OF THE DISCLOSURE

A tractor or prime mover is provided with a liquid tank-reservoir, a valve control system mounted adjacent the operator of the vehicle and a pair of outwardly extending articulated spray boom members. Each articulated boom member is provided with a pressure-operated cylinder which is adapted to swing the boom into a horizontal position upon the metering of the spray liquid to the cylinder by the valve control system; however, each boom is provided with a cut-off valve which prevents the spray liquid from exiting the spray nozzles until the boom is substantially in that horizontal position. Upon the closing of the valve control system, the pressure-operated cylinder is deactivated and a spring means returns the boom to a folded and vertically arranged position which simultaneously closes the cut-off valve.

BACKGROUND OF THE INVENTION (1) *Field of the invention.*—This invention relates to a mobile spraying apparatus and, more particularly, to an articulated spray boom and means for extending the spray boom into a substantially horizontal position which also includes means for returning the spray boom to a normally vertical position after spraying. Devices of this type are generally classified in Class 239, subclasses 71, 72, 124, 158, 159, 160, 161, 162, 165, 166, 169 and 170. The general class is fluid sprinkling, spraying and diffusing and, more specifically, fluid sprinkling having mobile tank type supply means which is provided with a spray boom or bar type distributor, or with an adjustable distributor having plural sections articulated or pivotally mounted.

(2) *Description of the prior art.*—Devices utilized to spray liquid formulations onto the grounds and plants include in addition to the necessary piping, a source of pressure, such as a pump, and a spray nozzle in order to achieve a patterned distribution of the liquid formulation. An example of pressurized sprayers heretofore used is the boom sprayer which is generally mounted upon the rear of a tractor with the pumping force being generated by power directly obtained from the tractor. Patent 2,565,587 to Boyett teaches the folding boom approach which is actuated by a cylinder which is connected directly to the pressurized fluid line. The cylinder is provided with a spring means for returning the boom to a normally vertical position. The folding boom portions of Boyett are not articulated in the sense that they are comprised of a plurality of outwardly folding members but only have one member pivotally mounted onto a stationary frame member. Further, the folding boom members of Boyett are pivoted only in the vertical direction which does not provide for a horizontal movement if the boom member should strike a stationary object. Also, the valve control means is mounted rearwardly with respect to the driver's seat and is comprised of only a single control means so that both oppositely extending foldable boom members are pivoted downwardly upon the actuation of either. Thus, while the Boyett apparatus represents an advancement in the art, Patent 3,285,516 to Waldrum teaches the combination of a mobile spraying apparatus and a vibrating device which adapts the spray orifices to achieve a uniformity of spray liquid particle size. Patent 2,584,484 to McIntosh discloses an apparatus of the typical type having the spray booms mounted for vertical adjustment so as to be adapted to spray vegetation of different heights. Patent 2,995,307 to McMahon teaches a mobile spray device having an articulated boom which adapts the same for spraying irregular surfaces such as the sides of hills and the like. Patent 3,023,970 to Knoell provides a mobile spray apparatus with a boom which may be manually moved horizontally as well as vertically and which is also axially rotatable in the mounting structure. Patent 3,055,594 to Nansel shows an articulated boom mounted onto a truck body which is energized by means of pulleys and pressure cylinders, the pressure cylinders receiving the pressurized fluid from a remote source. Patent 2,221,433 to Pitner discloses a foldable boom which is adapted to pivot horizontally and upwardly when striking an object to clear the same. Other representative patents include 2,590,400 to Gollnick, 2,965,304 to Krause and 3,117,725 to Palmer.

SUMMARY OF THE INVENTION

This invention is primarily directed to an articulated spray boom apparatus which is adapted to be mounted onto a standard tractor or similar prime mover. The tractor is provided with a vertically movable platform which includes a vertically positioned frame. The platform supports a tank which serves as a reservoir for the particular liquid to be sprayed. The frame includes a boom support bar which supports a pair of outwardly and oppositely directed articulated boom members by means of a spring loaded pivot which adapt the booms to be moved in the horizontal direction. Each boom includes an intermediate bar which is connected to the horizontal pivot, a first boom section which is connected to the intermediate bar to pivot in the vertical direction and a second boom section which is connected to the first boom section to pivot in the vertical direction. A hydraulic cylinder has one end mounted on the intermediate bar and has its piston shaft pivotally connected to the first boom section. The hydraulic cylinder is connected by lines to the liquid reservoir such that when spraying is to be commenced, the pressurized fluid enters the hydraulic cylinder and forces the first boom section outwardly and downwardly. Upon the downward movement of the first boom section, the second boom section is folded outwardly so that when the first boom section is substantially parallel to the ground, the second boom section forms a continuation thereof and is also parallel to the ground. When the flow of pressurized fluid, which energizes the hydraulic cylinder and which is sprayed onto the ground by nozzle members, is halted, the articulated boom structure is returned to its normal vertical position by a tension spring means. The second boom section may be actuated by a spring loaded pulley which is mounted at the joint between the first and second boom sections and is connected to the intermediate bar such that upon the downward movement of the first boom section, the second boom section is pivoted outwardly by the spring loaded pulley. When the first and second boom sections are pivoted into a normally vertical position by the tension spring means, the fluid flow to the boom members is halted by means of a cut-off valve. The second boom section may also be pivoted inwardly and outwardly by a shaft which is suspended between the second boom section and the intermediate bar whereby upon the downward movement of the first boom section by means of the hydraulic cylinder, the second boom section is pivoted outwardly and in alignment with the first boom section.

The liquid is supplied to the boom sections by a tubular conduit which is connected to a hand-operable valve control means which is mounted adjacent the steering wheel of the tractor. The valve control means includes a first lever mechanism which controls a first selected side and a second lever mechanism which controls a second side so that each individual boom structure may be made operative by the actuation of the appropriate lever mechanism. The lever mechanisms are connected to a fluid pump which supplies the liquid thereto under pressure by means of a flexible conduit. The liquid reservoir which is in the shape of a cylindrical drum is vertically mounted on a platform which is adapted to be raised and lowered by a power take-off means from the tractor.

Therefore, an object of this invention is to provide a horizontally extensible articulate spray boom member which is adapted to be moved into the horizontal position upon the movement of a handle control lever.

Another object of this invention is to provide an articulated spray boom which is adapted to be extended into a position being substantially parallel to the ground and which is adapted to receive a pressurized liquid only when it is in that parallel position.

A further object of this invention is to provide a tractor or prime mover with a pair of oppositely extending and independently operable articulated folding booms and a valve control means for each boom mounted adjacent the steering wheel of a tractor which are adapted to be opened singly or in unison by one hand of the operator.

Still another object of this invention is to provide an articulated folding boom structure wherein the extensible portions of the boom are moved to an extended horizontal position immediately before the liquid is applied to the spray nozzles and wherein the articulated boom portions are automatically returned to a normally collapsed vertical position when the flow of liquid to the spray nozzles is shut off by the appropriate handle control lever.

Yet another object of this invention is to provide a pressurized liquid spray apparatus of the kind which may derive power for operation from the power take-off of the tractor or may receive power from an independent power source.

DESCRIPTION OF THE DRAWINGS

These and other objects will become apparent when the following detailed description is read in conjunction with the drawings, in which:

FIGURE 1 is a rear elevation view of the spraying machine constructed according to the first embodiment of this invention showing the apparatus mounted on the rear of a tractor with the movable platform being raised a desired distance from the ground;

FIGURE 2 is an enlarged perspective view of one articulated boom member showing the same in an extended position and showing the elements comprising the same;

FIGURE 3 is an elevation view of the articulated boom showing the same in an extended position and showing a second embodiment for automatically returning the second boom section to a normally vertical position;

FIGURE 4 is an enlarged fragmentary partial cut-away view showing the spring loaded pulley wheel of the second embodiment mounted on the second boom section;

FIGURE 5 is an enlarged fragmentary view of the cam and cut-off valve for metering the pressurized fluid into the articulated boom member and showing the cut-off valve in a closed position;

FIGURE 6 is an enlarged fragmentary perspective view, looking from front to back, of the first embodiment of the spring loaded pivot joint which adapts the articulated boom to move horizontally in the rearward direction upon striking an object on the forward side thereof;

FIGURE 6-A is an enlarged fragmentary view showing portions of the spring loaded pivot joint of FIGURE 6 having been moved rearwardly;

FIGURE 8 is a side elevation view of the platform and platform support means which is connected to the tractor;

FIGURE 9 is an elevation view of the valve arrangement which is to be positioned adjacent the steering wheel and showing the proximity of the valve handles to each other;

FIGURE 10 is a schematic fluid flow diagram of the pressurized liquid showing the same being drawn out of a reservoir and eventually being ejected from the spray nozzles;

FIGURE 11 is an elevation view showing the articulated boom member in a normally at rest vertical position and showing the first embodiment for unfolding the second boom section;

FIGURE 12 is an elevation view showing the articulated boom member in a normally at rest vertical position and showing the second embodiment for unfolding the second boom section;

DETAILED DESCRIPTION OF THE PREFERRED EMBODIMENTS

Figure 13:
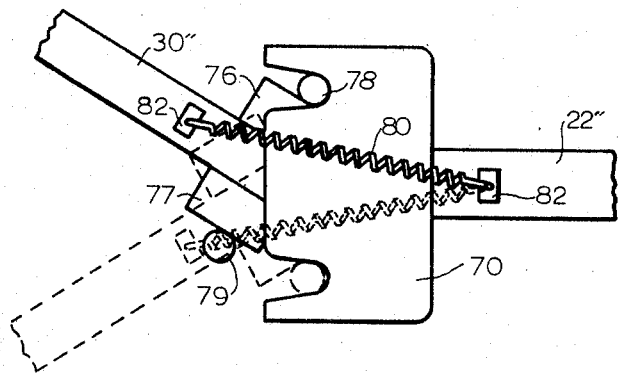
FIGURE 13 is a plan view of the second embodiment of the spring loaded pivot joint showing the articulated boom member having been moved in a first horizontal direction and, in skeletons, in a second horizontal direction.
Figure 7:
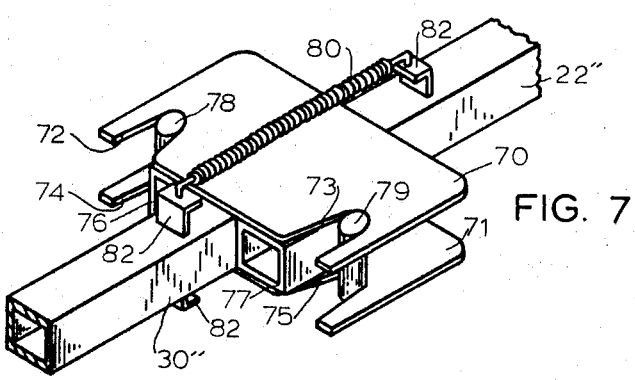
FIGURE 7 is an enlarged fragmentary perspective view of the second embodiment of the spring loaded pivot joint showing the same adapting the articulated boom member to be moved in either the forward or the rearward horizontal direction upon striking an object from the other side.

Tractor 10, which is representative of the prime movers to be used for transporting the apparatus of this invention, supports platform 11 by means of a conventional three-point lift or stabilized draw bar which include lift arms 12 and 13. Platform 11 is comprised of a floor 15, a front wall 17 and side support members 18. Floor 15 receives and supports drum 16 and front wall 17 and support members 18 position drum 16 laterally and prevent the same from being dislodged from platform 11. Support members 18 extend upwardly from floor 15 and are provided with openings 19. Bolts 20 are adapted to extend through a pair of aligned openings 19 and secure boom support bar 22 to support members 18. Boom support bar 22 is adapted to be moved vertically with respect to the ground by support arms 12 and 13 and also by being selectively positioned on support members 18. In effect, support members 18 and boom support bar 22 form a frame upon which articulated boom members 25 and 26 may be mounted.

Articulated boom members 25 and 26 are identical in structure and reference is made to FIGURE 2 for the detailed description of the same. Boom support bar 22 is connected to intermediate bar 30 by means of a horizontal pivoting joint 31. Where horizontal pivoting of the boom members is not desired, pivoting joint 31 and intermediate bar 30 may be eliminated. Pivoting joint 31 as shown in FIGURE 6 is comprised of a pair of spaced, horizontally disposed and parallel plates 32 and 33 which are rigidly mounted on boom support bar 22. Plates 32 and 33 receive a portion of one end of intermediate bar 30 which is pivotally mounted therein by means of pivot pin 34 which extends through plate 32, intermediate bar 30 and plate 33. In order that boom structure 25 may pivot only in the rearward direction, intermediate bar 30 is provided with a vertically aligned limit bar 35 which is adapted to engage plates 32 and 33 and to position intermediate bar 30 normally in axial alignment with boom support bar 22. Intermediate bar 30 is normally maintained in axial alignment with boom support bar 22 by means of a spring 37 which is connected to intermediate bar 30 and boom support bar 22 by means of posts 38 and 39, respectively. Therefore, when intermediate bar 30 and, resultingly, articulated boom member 25 are pivoted in the rearward direction as shown in FIGURE 6-A, spring 37 is adapted to return intermediate bar 30 to a position whereby limit bar 35 maintains intermediate bar 30 in axial alignment with boom support bar 22. Articulated boom member 25 is comprised of a first boom section 40 which is mounted on intermediate bar 30 so as to pivot vertically by hinge pin 41 and a second boom section 42 which is pivotally connected to first boom section 40 by means of hinge pin 43. Spring 45 normally positions first boom section 40 perpendicularly with respect to intermediate bar 30 and is connected respectively thereto by means of post 46 and stake 47. First boom section 40 is pivoted downwardly and into a position of axial alignment with intermediate bar 30 by means of a fluid energized piston and cylinder arrangement 50. Cylinder 51 is pivotally mounted on intermediate bar 30 by means of stake 52 and piston extension 53 is pivotally connected to post 46 so that upon the entrance of pressurized liquid into cylinder 51, piston extension 53 forces first boom section 40 outwardly and downwardly. Upon the downward pivoting movement of first boom section 40, second boom section 42 is pivoted relative first boom section 40 outwardly by shaft 54 which is connected to intermediate bar 30 and to second boom section 42 by means of stakes 55 and 56, respectively.

An alternative method of recoiling second boom section 42' is as shown in FIGURES 3, 4 and 12 and includes wheel 60 which is provided with a grooved periphery 61, a flexible cord 62 and a tension spring 63. Cord 62 has one end connected to stub 64 which is securely mounted on intermediate bar 30' and the other end connected to spring 63 with an intermediate length thereof being received by periphery 61 of wheel 60. Wheel 60 is securely mounted onto second boom member 42', is pivotally mounted on first boom section 40' by means of pivot pin 49 and has a section of flexible cord 62 extending through openings 65 and 66 of wheel 60 so as to prevent cord 62 from slipping in groove periphery 61. Spring 63 has one end secured to cord 62 and the other end rigidly mounted on first boom section 40' by means of post 67. As first boom section 40' pivots downwardly, tension spring 63 expands and allows cord 62 to pull second boom section 42' outwardly and about pivot pin 49 so that when first boom section 40' is in substantial axial alignment with intermediate bar 30', second boom section 42' has been pivoted into substantially axial alignment with first boom section 40' to form a continuation of the same.

Figure 14:
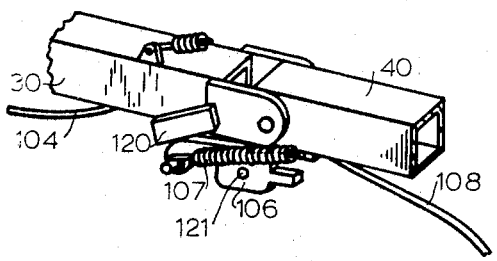
FIGURE 14 is a perspective view of the cut-off valve of FIGURE 5 showing the articulated boom member in a horizontal position and the cut-off valve in an open position.
Figure 15:
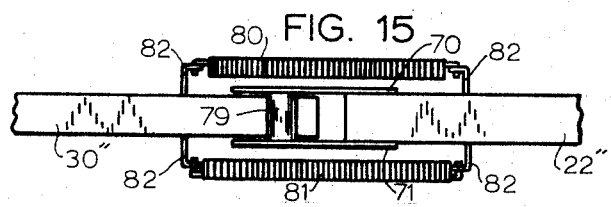
FIGURE 15 is a fragmentary side elevation view of the second embodiment of the spring loaded pivot joint.

Referring now to FIGURES 13, 14 and 15, to provide articulated boom sections which may be pivoted horizontally in either direction, boom support bar 22" is provided with horizontally disposed parallel and spaced-apart plates 70 and 71. Plate 70 is provided with opposed and inwardly extending indentions 72 and 73 which are in vertical alignment with indentions 74 and 75 of plate 71. Intermediate bar 30" is provided with laterally spaced members 76 and 77 adjacent its end which are to be received by plates 70 and 71. Members 76 and 77 are respectively provided with bars 78 and 79 which are vertically positioned and are adapted to normally reside in indentions 72 and 74 and in indentions 73 and 75, respectively. Bars 78 and 79 are normally seated in their respective indentions by springs 80 and 81 which are connected to intermediate bar 30" and boom support member 22" by means of stakes 82. Bars 78 and 79 are each adapted to act as a pivot pin when intermediate bar 30" is pivoted in that direction whereupon the other bar is moved outwardly with respect to its housing indention. Upon the release of the pivoting force exerted against intermediate bar 30", springs 80 and 81 return the displaced bar to its normal resting position in its respective indention.

In reference to the hydraulic system as shown in FIGURE 10, drum 16 contains a liquid which may be water, a herbicide, a liquid fertilizer or the like. The liquid is withdrawn from drum 16 by means of a displacement pump 90 which is connected thereto by means of conduit 91. Pump 90 places the liquid under a positive pressure as it enters conduit 92. Conduit 92 is also provided with a check valve 93 which prevents the liquid from draining from conduit 92 which would result in pump 90 having to be primed after every stoppage thereof. Going forwardly, conduit 92 branches into conduits 94 and 95 which are respectively connected to directional valves 96 and 97, conduit 94 also being provided with a pressure gauge for determining the pounds of pressure in the same. When pump 90 is in operation, the liquid flows through directional valves 96 and 97 continuously and the position of handles 98 and 99 determine into which conduits the liquid is directed. Conduit 100 leads the liquid away from directional valve 96 and into conduit 101 which directs the liquid back into drum 16 when handle 98 is in a vertically up and inoperative position. Likewise, conduit 102 directs the fluid into conduit 101 which empties the liquid into drum 16 when handle 99 is in a vertically up and inoperative position.

When handle 98 is pulled downwardly into a substantially horizontal position, the liquid is diverted from conduit 100 into conduit 103 which directs the same into cylinder and piston arrangement 50. The liquid normally passes through piston and cylinder arrangement 50 into conduit 104 and to cut-off valve 105; however, when the system is first energized, cut-off valve 105 is closed and the liquid forces piston extension 53 outwardly which pivots first boom section 40 downwardly.

With reference to FIGURE 5, cut-off valve 105 is mounted on first boom section 40 and is connected to cam 106 which rests against cam arm 120 which is connected to intermediate bar 30. Cam 106 is maintained against cam arm 120 at all times by spring 107 which is connected to cam 106 and to first boom section 40. Upon the downward movement of first boom section 40 to a substantially horizontal position, cut-off valve 105, which pivots about shaft 121 which is rigidly secured to cam 106, is opened and allows the liquid to pass therethrough into conduit 108 which directs the same to nozzles 109 which are mounted on first boom section 40 and second boom section 42. Thus, only when first and second boom sections 40 and 42 are in a horizontally disposed position is the liquid allowed to pass through cut-off valve 105 and into conduit 108 and it can be seen that such an arrangement prevents premature spraying.

Upon the movement of handle 98 from the horizontal position to the vertical position, the liquid is once again directed from conduit 103 into conduit 100 thus relieving the pressure in piston and cylinder arrangement 50 and allowing spring 45 to pivot first boom section 40 upwardly whereby piston extension 53 is moved inwardly into cylinder 51 and cut-off valve 105 is once again closed.

Correspondingly, upon the downward movement of handle 99, the liquid is directed from conduit 102 into conduit 110 which feeds the liquid into piston and cylinder arrangement 111, piston and cylinder arrangement being mounted on boom 26. Conduit 112 leads the liquid away from piston and cylinder arrangement 111 into cut-off valve 113 which, when open, allows the liquid to travel into conduit 114 and out of nozzles 115.

In FIGURE 9, it can be seen that the hand-receiving portions of handles 98 and 99 are in axial alignment and are adapted to be operated by a single hand of the user so that both articulated boom members 25 and 26 may be energized simultaneously while still driving the tractor with the other hand. Also, each articulated boom member may be energized independently of the other so that the edges of the field or the like may be sprayed without wasting the liquid unnecessarily.

What I claim is:
1. A liquid spray apparatus for attachment to a tractor vehicle having a steering wheel and comprising:
 (a) a platform mounted on said vehicle;
 (b) a reservoir supported by said platform and containing a liquid;
 (c) a pump in communication with said reservoir for withdrawing said liquid therefrom and for pressurizing the same;
 (d) a frame vertically mounted on said platform;
 (e) articulated boom members including an intermediate bar member pair pivotally mounted on opposite sides of said frame and being positioned to be axially aligned and to extend outwardly in diametrically opposite directions and a first and second boom section pair mounted on said intermediate bar pair, said boom section pairs being adapted to pivot in the vertical direction and being pivotally connected and normally arranged in a folded and upwardly extending vertical position and being adapted to be unfolded into an extended horizontal position in axial alignment with said intermediate bar members;
 (f) spray members carried by said pair of boom section members;
 (g) flexible conduits connecting said spray members with said pump;
 (h) plural first valve means positioned adjacent said steering wheel and connected to said flexible conduits and interposed between said pump and said spray members for allowing said pressurized fluid to be selectively directed to and to pass through said flexible conduits to said boom section spray members when selected said first valve means are open, each of said first valve means being provided with an upwardly extending lever, said levers having horizontal portions being in axial alignment with and being adjacent to each other when vertically disposed relative said first valve means;
 (i) pressurized fluid operated means mounted on said frame and connected to said boom section members and being joined to said flexible conduit between said first valve means and said spray members for pivoting said boom section members from a normally folded vertical position to an extended horizontal position upon the opening of said first valve means;
 (j) second valve means connected to said flexible conduit between said pressurized fluid operated means and said spray members for allowing the passage of said pressurized liquid to said spray members only when said boom section members are in said extended horizontal position; and
 (k) recoil means suspended between said frame and said boom section members for returning said boom section members to said normally folded vertical position upon the closing of said first valve means.

2. The liquid spray apparatus of claim 1 wherein said pair of intermediate bar members are pivotally mounted on said frame by means adapting all of said articulated boom members when in said extended axially aligned horizontal position to pivot in a horizontal plane, said means normally maintaining said boom members in axial alignment when so extended horizontally and being provided with spring means to return said boom members to said axially aligned horizontal extended position upon the same having been moved sideways in said horizontal plane.

3. The liquid spray apparatus of claim 2 including for each of said intermediate bar members a pair of spaced horizontally disposed and parallel plates mounted on said frame and receiving one end of the respective said intermediate bar member between said plates, vertically disposed pin means extending through said plates and the respective said intermediate bar member to pivotally connect said intermediate bar member with said plates, a vertically arranged limit bar mounted on each respective said intermediate bar member to normally engage said plates, said limit bar adapted to be moved outwardly from said plates upon the pivoting of said respective intermediate bar member in a horizontal and rearwardly direction and to prevent pivoting movement in the horizontal and forwardly direction and a spring suspended between said frame and connected to said respective intermediate bar member for returning said limit bar into engagement with said plates upon the pivoting of said respective intermediate bar member.

4. The liquid spray apparatus of claim 2 including for each of said intermediate bar members a pair of horizontally disposed parallel and spaced apart plates mounted on said frame and being adapted to receive an end of said respective intermediate bar member, said plates each having a pair of spaced apart indentions being in vertical alignment with said indentions of said other plate, a pair of vertically arranged and parallel pivot bars mounted on respective sides of and substantially adjacent to said received end of said respective intermediate bar member, said pivot bars being received by said plate indentions and a pair of springs mounted on said frame extending across said plates and being connected to said respective intermediate bar member whereby said intermediate bar member is adapted to pivot horizontally about either of said pivot bars and to be returned to said axially aligned position by said springs.

5. The liquid spray apparatus of claim 3 wherein the respective said first pair boom section members are mounted on the respective said intermediate bar members to pivot in the vertical direction and the respective second pair boom section members are mounted on the outwardly extending end of the respective first pair boom section members to pivot in the vertical direction, said first and second pair boom section members being normally positioned so that each respective said first pair boom section member extends vertically upwardly from said pivot connection with the respective said intermediate bar member and each respective second pair boom section member extends vertically downwardly from said pivot connection with the respective said first pair boom section member whereby upon the opening of the appropriate first valve means, said first and second pair boom section members unfold outwardly into a substantially horizontal and axially aligned position.

6. The liquid spray apparatus of claim 5 including a vertically arranged and upwardly extending stake mounted on each respective said first pair boom section member outwardly a distance from said pivotal connection with the respective said intermediate bar member, a tension spring suspended between said stake and said respective intermediate bar member and connected to said intermediate bar member for normally maintaining said first pair boom section member in a vertically and upwardly extended position, and a connecting rod positioned vertically above said first pair boom section member and pivotally joined to said second pair boom section member and to said intermediate bar member whereby upon the downward movement of said first pair boom section member, said connecting rod pivots said second pair boom section member outwardly into substantial axial alignment with said first pair boom section member.

7. The liquid spray apparatus of claim 5 including a spring suspended between and connected to each respective said intermediate bar member and said first pair boom section member for normally maintaining said first pair boom section member in a vertically and upwardly extended position, a wheel having a grooved periphery rigidly mounted on said second pair boom section member and rotatably connected to said first pair boom section member for pivotally connecting said second pair boom section member with said first pair boom section member, and tensioned cord means including a length of flexible cord connected at one end to said intermediate bar member and having a portion thereof extending around and being frictionally received by said grooved periphery of said wheel and an elongated tension spring having a first end connected to said first pair boom section member and a second end connected to the other end of said flexible cord whereby upon the downward pivotal movement of said first pair boom section member, said tensioned cord means is effective to pivot said second pair boom section member and said wheel about said pivotal connections with said first pair boom section member into axial alignment therewith when said first pair boom section member reaches said horizontal position.

References Cited

UNITED STATES PATENTS

| | | | |
|---|---|---|---|
| 2,221,433 | 11/1940 | Pitner | 239—71 |
| 2,565,587 | 8/1951 | Boyett | 239—168 |
| 2,584,484 | 2/1952 | McIntosh | 239—158 |
| 2,590,400 | 3/1952 | Gollnick | 239—166 |
| 2,770,493 | 11/1956 | Fieber | 239—168 |
| 2,965,304 | 12/1960 | Krause | 239—166 |
| 2,995,307 | 8/1961 | McMahon | 239—161 |
| 3,023,970 | 3/1962 | Knoell | 239—167 |
| 3,055,594 | 9/1962 | Nansel | 239—166 |
| 3,117,725 | 1/1964 | Palmer | 239—168 |
| 3,285,516 | 11/1966 | Waldrum | 239—102 |

EVERETT W. KIRBY, *Primary Examiner.*

U.S. Cl. X.R.

239—71, 158